(12) United States Patent
Charasson et al.

(10) Patent No.: US 11,148,475 B2
(45) Date of Patent: Oct. 19, 2021

(54) TREAD FOR AN AGRICULTURAL VEHICLE TIRE

(71) Applicant: COMPAGNIE GENERALE DES ETABLISSEMENTS MICHELIN, Clermont-Ferrand (FR)

(72) Inventors: Bruno Charasson, Clermont-Ferrand (FR); Marc Gandillet, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 379 days.

(21) Appl. No.: 16/471,670

(22) PCT Filed: Dec. 18, 2017

(86) PCT No.: PCT/FR2017/053643
§ 371 (c)(1),
(2) Date: Jun. 20, 2019

(87) PCT Pub. No.: WO2018/115676
PCT Pub. Date: Jun. 28, 2018

(65) Prior Publication Data
US 2020/0086690 A1 Mar. 19, 2020

(30) Foreign Application Priority Data
Dec. 20, 2016 (FR) .................................... 1662819

(51) Int. Cl.
*B60C 11/11* (2006.01)
*B60C 11/13* (2006.01)
*B60C 11/03* (2006.01)

(52) U.S. Cl.
CPC ... *B60C 11/0316* (2013.01); *B60C 2011/0313* (2013.01); *B60C 2200/08* (2013.01)

(58) Field of Classification Search
CPC ................... B60C 11/0316; B60C 2011/0313
See application file for complete search history.

(56) References Cited

U.S. PATENT DOCUMENTS 3,603,370 A 9/1971 Hylbert et al.
4,131,148 A 12/1978 Bertazzoli et al.
(Continued)

FOREIGN PATENT DOCUMENTS

EP 795 427 9/1997
EP 903 249 3/1999
(Continued)

OTHER PUBLICATIONS

Machine Translation: JP-08034210-A, Iijima, Tokuichiro, (Year: 2021).*

*Primary Examiner* — Kendra Ly
(74) *Attorney, Agent, or Firm* — Cozen O'Connor

(57) ABSTRACT

Tire (1) for an agricultural vehicle, and more particularly the tread (2) thereof, has improved traction in the field, while reducing the sensitivity of the lugs (3) to attack by stubble. Each lug (3) comprises first lug portion (31), having height H1, and second lug portion (32), having height H2 and having a mean angle of inclination A2 with respect to circumferential direction (XX') of the tire. The first lug portion (31) is comprised of a radial superposition of N layers $C1_i$ (33), where i varies from 1 to N, each having a height $H1_i$, each layer $C1_i$ having a mean angle of inclination $A1_i$ strictly less than the mean angle of inclination A2, and, when N is strictly greater than 1, the angle $A1_j$ relative to a layer $C1_j$, where j varies from 1 to N−1, is strictly less than the angle $A1_{j+1}$ relative to the layer $C1_{j+1}$.

15 Claims, 4 Drawing Sheets

(56) References Cited

U.S. PATENT DOCUMENTS

| | | | |
|---|---|---|---|
| 4,186,788 A * | 2/1980 | Pommier | B60C 11/0316 |
| | | | 152/209.12 |
| 4,383,567 A | 5/1983 | Crum et al. | |
| 4,446,902 A | 5/1984 | Madec et al. | |
| 4,611,647 A | 9/1986 | Rimondi | |
| 5,010,935 A | 4/1991 | Bonko et al. | |
| 2016/0068025 A1 * | 3/2016 | Kodama | B60C 11/0311 |
| | | | 152/209.12 |
| 2016/0193882 A1 * | 7/2016 | Mancinelli | B60C 11/0316 |
| | | | 152/209.12 |

FOREIGN PATENT DOCUMENTS

| | | | |
|---|---|---|---|
| EP | 1 831 034 | 9/2007 | |
| FR | 2 382 348 | 9/1978 | |
| JP | 08034210 A * | 2/1996 | |
| JP | 11115417 | 4/1999 | |
| WO | WO-0066372 A1 * | 11/2000 | B60C 11/0316 |

\* cited by examiner

TREAD FOR AN AGRICULTURAL VEHICLE TIRE

RELATED APPLICATIONS

This is a U.S. National Phase Application under 35 USC 371 of International Application PCT/FR2017/053643 filed on Dec. 18, 2017.

This application claims the priority of French application no. 1662819 filed Dec. 20, 2016, the entire content of which is hereby incorporated by reference.

FIELD OF THE INVENTION

The present invention relates to a tire for an agricultural vehicle, such as an agricultural tractor or an agri-industrial vehicle, and relates more particularly to the tread of such a tire.

BACKGROUND OF THE INVENTION

In the following text, the circumferential, axial and radial directions refer to a direction tangential to the tread surface and oriented in the direction of rotation of the tire, to a direction parallel to the axis of rotation of the tire, and to a direction perpendicular to the axis of rotation of the tire, respectively.

A tire for an agricultural vehicle is intended to run over various types of ground such as the more or less compacted soil of the fields, unmade tracks providing access to the fields, and the tarmac surfaces of roads. Bearing in mind the diversity of use, in the fields and on the road, a tire for an agricultural vehicle, and in particular the tread thereof, needs to offer a performance compromise between traction in the field, resistance to chunking, resistance to wear on the road, rolling resistance, and vibrational comfort on the road, this list not being exhaustive.

In order to satisfy all of these performance requirements, the tread of a tire for an agricultural vehicle generally comprises a plurality of lugs, raised elements extending radially from a bottom surface to the tread surface.

A lug generally has an elongate parallelepipedal overall shape made up of at least one rectilinear or curvilinear portion, and is separated from the adjacent lugs by grooves. A lug may be made up of a succession of rectilinear portions, as described in the documents U.S. Pat. Nos. 3,603,370, 4,383,567, EP795427 or may have a curvilinear shape, as set out in the documents U.S. Pat. No. 4,446,902, EP903249, EP1831034.

In the following text, an axially inner lug portion will be referred to as lug nose, and an axially outer lug portion will be referred to as lug wing.

In the radial direction, a lug extends from the bottom surface to the tread surface, the radial distance between the bottom surface and the tread surface defining the lug height. The radially outer face of the lug, belonging to the tread surface, which comes into contact with the ground as the lug enters the contact patch in which the tire is in contact with the ground, is known as the contact face of the lug. The lug portion in the vicinity of the bottom surface is known as the lug base.

In the axial direction, a lug extends inwards from an axial end of the tread. Generally, a lug extends axially inwards from an axially outer end face, positioned at the lug wing, to an axially inner end face, positioned at the lug nose, closer to the equatorial plane of the tire. By definition, the equatorial plane is a circumferential plane, perpendicular to the axis of rotation of the tire and passing through the middle of the tread thereof.

In the circumferential direction, a lug extends, in a preferred direction of rotation of the tire, between a leading face and a trailing face. A preferred direction of rotation means the direction of rotation recommended by the manufacturer of the tire for optimum use of the tire. By way of example, in the case of a tread comprising two rows of lugs configured in a V or chevron formation, the tire has a preferred direction of rotation according to the point of the chevrons. The leading face is, by definition, the face of which the radially outer edge face or leading edge face is first to come into contact with the ground when the lug enters the contact patch in which the tire is in contact with the ground, as the tire rotates. The trailing face is, by definition, the face of which the radially outer edge or trailing edge is last to come into contact with the ground when the lug enters the contact patch in which the tire is in contact with the ground, as the tire rotates. In the direction of rotation, the leading face is said to be forward of the trailing face.

A lug usually has a mean angle of inclination, with respect to the circumferential direction, close to 45°, the mean angle of inclination being the angle of the straight line passing through the axial ends of the lug. Specifically, this mean angle of inclination allows in particular a compromise between traction in the field and vibrational comfort. Traction in the field is better if the lug is more radial, that is to say if its mean angle of inclination is close to 90°, whereas vibrational comfort is better if the lug is more longitudinal, that is to say if its mean angle of inclination is close to 0°. It is a well-known fact that traction in the field is more greatly determined by the angle of the lug in the shoulder region, and this has led certain tire designers to offer a very curved lug shape, leading to a lug that is substantially radial at the shoulder and substantially longitudinal in the middle of the tread.

The tread of a tire for an agricultural vehicle usually comprises two rows of lugs as described above. This distribution of lugs which are inclined with respect to the circumferential direction gives the tread a V shape commonly referred to as a chevron pattern. The two rows of lugs exhibit symmetry with respect to the equatorial plane of the tire, usually with a circumferential offset between the two rows of lugs, resulting from one half of the tread being rotated about the axis of the tire with respect to the other half of the tread. Furthermore, the lugs may be continuous or discontinuous and may be circumferentially distributed with a spacing that is either constant or variable.

Various designs of lugged treads have been proposed, depending on the desired performance improvement, as shown for example by the documents cited below. The document U.S. Pat. No. 4,131,148 presents a faceted bottom surface for improving traction in the field and self-cleaning of the tread. The document U.S. Pat. No. 4,611,647 proposes a lug having a leading face of which the circumferential profile, along a circumferential plane, parallel to the equatorial plane, is convex and curvilinear, in order to improve wear resistance, traction efficiency and lifetime. The document U.S. Pat. No. 5,010,935 describes a lug of which the leading face has a concave circumferential profile with two inclinations, for better traction in the field and better resistance to chunking. The document JP11115417 describes a lug of which the leading face has a convex circumferential profile with two inclinations, in order to improve traction in the field and self-cleaning of the tread.

The improvement in traction in the field is therefore a constant concern for designers of tires for agricultural vehicles, as shown by the prior art patent documents cited above.

Moreover, as regards operation in the fields, another significant concern for tire designers is the improvement in the resistance of the lugs to attack, and more particularly to attack by residual stubble in the fields after harvesting. Stubble consists of plant stem portions, the free end of which is generally sharp. The sharp free end of a piece of stubble that comes into contact with the leading face of a lug is able to locally and superficially pierce the latter, causing local chunking of the constituent elastomeric material of the lug. Repeated attacks on the leading faces of the lugs by stubble can cause significant deterioration of the aspect of the lugs, or even chunking notably at the axially inner ends of the lugs, or lug noses. This deterioration is a potential reason for complaint on the part of users, possibly requiring replacement of the tire.

SUMMARY OF THE INVENTION

One object of the present invention is to improve traction in the field, while reducing the sensitivity of the leading faces of the lugs of a tread of a tire for an agricultural vehicle to attack by residual stubble after harvesting, and therefore reducing the risk of chunking in particular at the lug noses.

This aim has been achieved according to one aspect of the invention by a tire for an agricultural vehicle, comprising:

a tread made up of lugs that are separated from one another by grooves, each lug extending radially outwards, over a height H, from a bottom surface to a contact face, extending axially inwards from an axially outer end face to an axially inner end face, and extending circumferentially from a trailing face to a leading face, each lug comprising a first lug portion, extending radially outwards from the bottom surface and having a height H1, and a second lug portion, extending radially outwards from the first lug portion to the contact face, having a height H2 and having a mean angle of inclination A2 with respect to a circumferential direction of the tire.

the first lug portion being made up of a radial superposition of N layers $C1_i$, where i varies from 1 to N, each having a height $H1_i$, such that the sum of the heights $H1_i$ is equal to the height H1 of the first lug portion, the layer $C1_1$ extending radially outwards from the bottom surface and the layer $C1_N$ extending radially outwards to the second lug portion, each layer $C1_i$ having a mean angle of inclination $A1_i$, with respect to the circumferential direction of the tire, that is strictly less than the mean angle of inclination A2 of the second lug portion, such that the layer $C1_i$ is positioned in front of the leading face in the vicinity of the axially inner end face and behind the trailing face in the vicinity of the axially outer end face, and, when N is strictly greater than 1, the angle $A1_j$ relative to a layer $C1_j$, where j varies from 1 to N−1, being strictly less than the angle $A1_{j+1}$ relative to the layer $C1_{j+1}$, such that two consecutive layers ($C1_j$, $C1_{j+1}$) are rotationally offset with respect to one another by an angle $B1_j = A1_{j+1} - A1_j$.

According to an embodiment of the invention, a lug of a tread of a tire for an agricultural vehicle is made up substantially of a first, radially inner lug portion having a height H1 and of a second, radially outer lug portion having a height H2 and a mean angle of inclination A2. By convention, mean angle of inclination of a lug or of a lug portion is the name given to the angle formed by the straight line passing through the axial ends of the lug or of the lug portion, that is to say passing through the axially outermost and innermost points, respectively, with a circumferential direction of the tire. Since the inclination of this straight line with respect to said circumferential direction can be measured by two complementary angles, the angle taken into account is, by convention, the one which has the smallest absolute value.

Moreover, essentially, the first lug portion is made up of a superposition, in other words a stack, of N layers $C1_i$, where i varies from 1 to N, that do not necessarily all exhibit the same height $H1_i$. The radially innermost layer, in contact with the bottom surface, is the layer $C1_1$. The radially outermost layer, in contact with the second lug portion, is the layer $C1_N$. The layers $C1_i$ each have mean angles of inclination $A1_i$ with respect to the circumferential direction of the tire that are all less than the mean angle of inclination A2 of the second lug portion. In other words, all the layers $C1_i$, which make up the first, radially inner lug portion, exhibit mean directions closer to the circumferential direction than that of the second, radially outer lug portion. This means in particular that all the layers $C1_i$ are positioned in front of the leading face, that is to say offset forwards, in the vicinity of the axially inner end face, and behind the trailing face, that is to say offset towards the rear, in the vicinity of the axially outer end face, that is to say they form a stepped protuberance on the front face of the lug nose and a stepped protuberance on the trailing face of the lug wing. Finally, the mean angles of inclination $A1_i$ decrease from the layer $C1_1$ to the layer $C1_N$, causing an angular offset from one layer to the next and conferring a stepped shape on the above-described protuberances.

The local thickening of the lug nose and of the lug wing has the technical effect of increasing the lug stiffness in these zones, thereby improving the traction capability of the tire, and also of providing protection for the lug base, in the vicinity of the bottom surface, with regard to attack by residual stubble. Furthermore, the stepped shape of the first, radially inner portion creates a plurality of edge faces favourable to unclogging in the field, that is to say the self-cleaning of the tire.

The height H1 of the first lug portion is advantageously strictly less than the height H of the lug, preferably at most equal to 0.5 times the height H of the lug. A height H1 of the first lug portion cannot be equal to the height H of the lug, since the lug comprises a second, radially outer lug portion having a height H2. Preferably, the height H1 is limited to half the height H, in order to ensure flexibility of the lug that is suitable as regards the behaviour of the tire and in order to have a sufficient inter-lug volume that ensures a traction capability in the field.

The height H1 of the first lug portion is further advantageously at least equal to min (6 mm, 0.25*H). The technical effect of this feature, more particularly as regards the resistance to attack by stubble and as regards unclogging, is actually only significant from a minimum volume of first lug portion.

According to one advantageous embodiment, the height $H1_i$ of each layer $C1_i$ is advantageously at most equal to 0.5 times the height H1 of the first lug portion. This feature means that the first lug portion comprises at least two layers, and is thus characterized by a stepped shape with at least two steps, allowing progressive deviation of the sharp ends of pieces of stubble attacking the lug base, this being favourable to progressive protection of the lug base.

The height $H1_i$ of each layer $C1_i$ is further advantageously at least equal to min (3 mm, 0.1*H1). The capability of resistance to attack by stubble is actually only significant from a minimum thickness of the elementary layer.

The height $H1_i$ of each layer $C1_i$, where i varies from 1 to N, is preferably equal to H1/N. In this preferred embodiment, the first lug portion is made up of a stack of layers of the same thickness.

The angle $B1_j = A1_{j+1} - A1_j$ between two consecutive layers ($C1_j$, $C1_{j+1}$), where j varies from 1 to N−1, is further preferably equal to $(A1_N - A1_1)/(N-1)$. In this other preferred embodiment, the first lug portion is made up of a stack of layers in which the angular offset between two successive layers is constant.

The first lug portion is advantageously made up of a radial superposition of N layers $C1_i$, where i varies from 1 to N, with N at least equal to 2. A stack of at least two layers contributes towards progressive deviation of the sharp ends of stubble attacking the lug base and towards progressive protection of the lug base, on account of a greater volume of material at the lug base.

The first lug portion is further advantageously made up of a radial superposition of N layers $C1_i$, where i varies from 1 to N, with N at most equal to 10. When N increases, the unclogging, or self-cleaning, capability of the lug increases since the number of edge faces at the lug base increases. Moreover, the protuberance, formed by the first radial portion, has a stepped shape that tends towards a more continuous shape, favourable to the progressive deviation of the sharp ends of stubble attacking the lug base and thus to protection from attack.

The angle $A1_1$ relative to the layer $C1_1$, which is radially innermost, is advantageously at least equal to A2−45°. This feature limits the volume of the first radial portion, thereby ensuring flexibility of the lug that is suitable as regards the behaviour of the tire and a sufficient inter-lug volume ensuring a traction capability in the field.

The angle $A1_N$ relative to the layer $C1_N$, which is radially outermost, is also advantageously at most equal to A2−1°. This feature ensures a minimum volume of the first radial portion, and consequently a significant effect of the invention.

The angle $B2 = A2 - A1_N$ is advantageously equal to $(A1_N - A1_1)/(N-1)$. According to a preferred embodiment, the angle $B1_j = A1_{j+1} - A1_j$, between two consecutive layers ($C1_j$, $C1_{j+1}$), where j varies from 1 to N−1, and the angle $B2 = A2 - A1_N$, between the radially outermost layer of the first lug portion and the second lug portion, are equal to $(A1_N - A1_1)/(N-1)$.

Two consecutive layers ($C1_j$, $C1_{j+1}$), where j varies from 1 to N−1, are preferably joined together by fillets. On a technological level, given the machining constraints of the moulded parts, the various layers are usually joined in pairs by fillets with a radius usually at least equal to 3 mm.

The tread is preferably made up of a first and a second row of lugs disposed in chevrons with respect to the equatorial plane of the tire. This chevron-formation embodiment of the tread is very common for a tread of a tire for an agricultural vehicle.

BRIEF DESCRIPTION OF THE DRAWINGS

The present invention will be understood better with the aid of FIGS. 1 to 4 described below, in which.

DETAILED DESCRIPTION OF THE DRAWINGS

Figure 1:
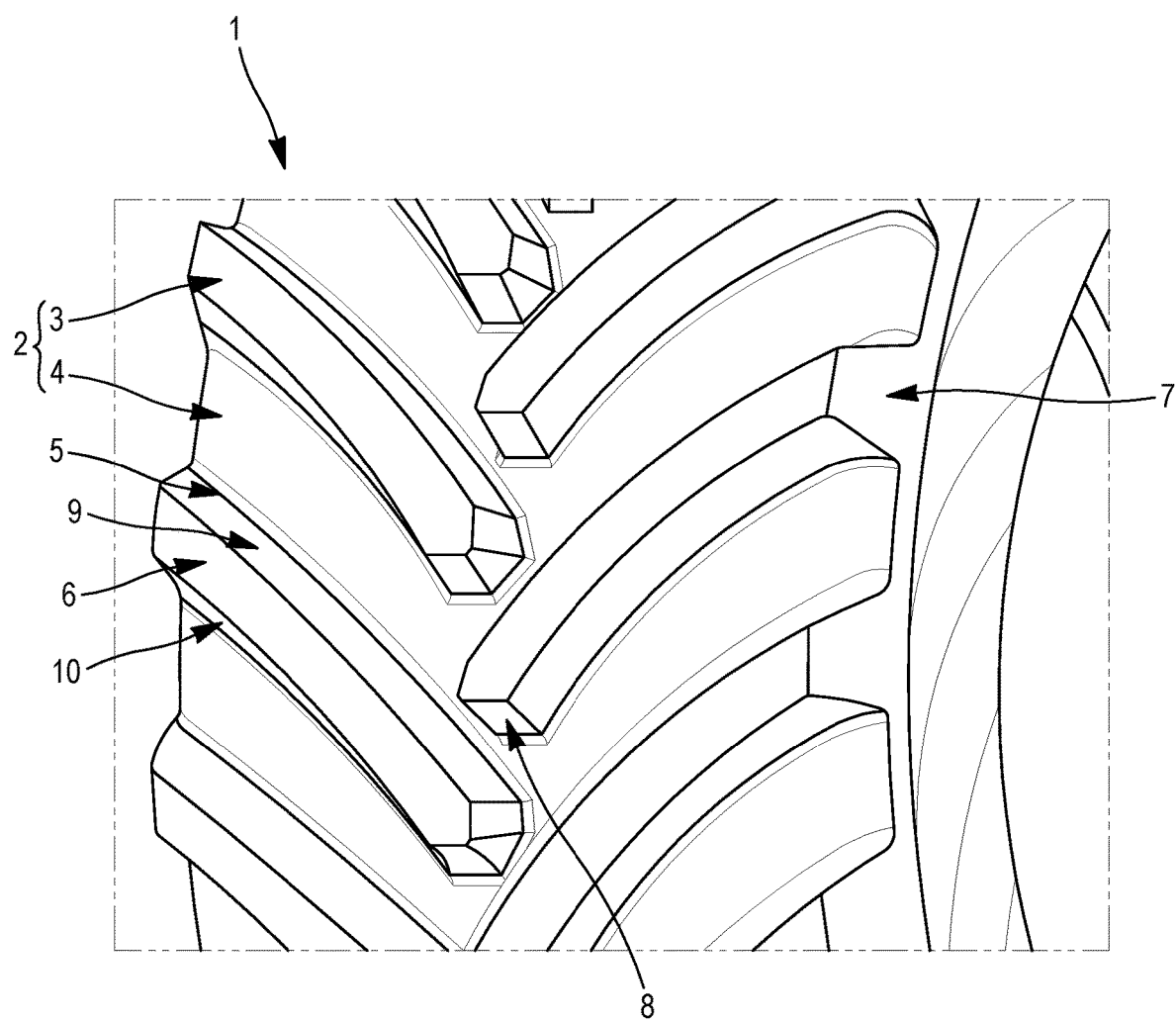
FIG. 1 shows a perspective view of a tire portion for an agricultural vehicle of the prior art.

FIG. 1 is a perspective view of a portion of a tire 1 for an agricultural vehicle of the prior art. The tread 2 of the tire is made up of lugs 3 that are separated from one another by grooves 4. Each lug 3 extends radially outwards, from a bottom surface 5 to a contact face 6, extends axially inwards from an axially outer end face 7 to an axially inner end face 8, and extends circumferentially from a trailing face 9 to a leading face 10. In the present case, the tread is made up of a first and a second row of lugs 3 disposed in chevrons with respect to the equatorial plane of the tire.

Figure 2:
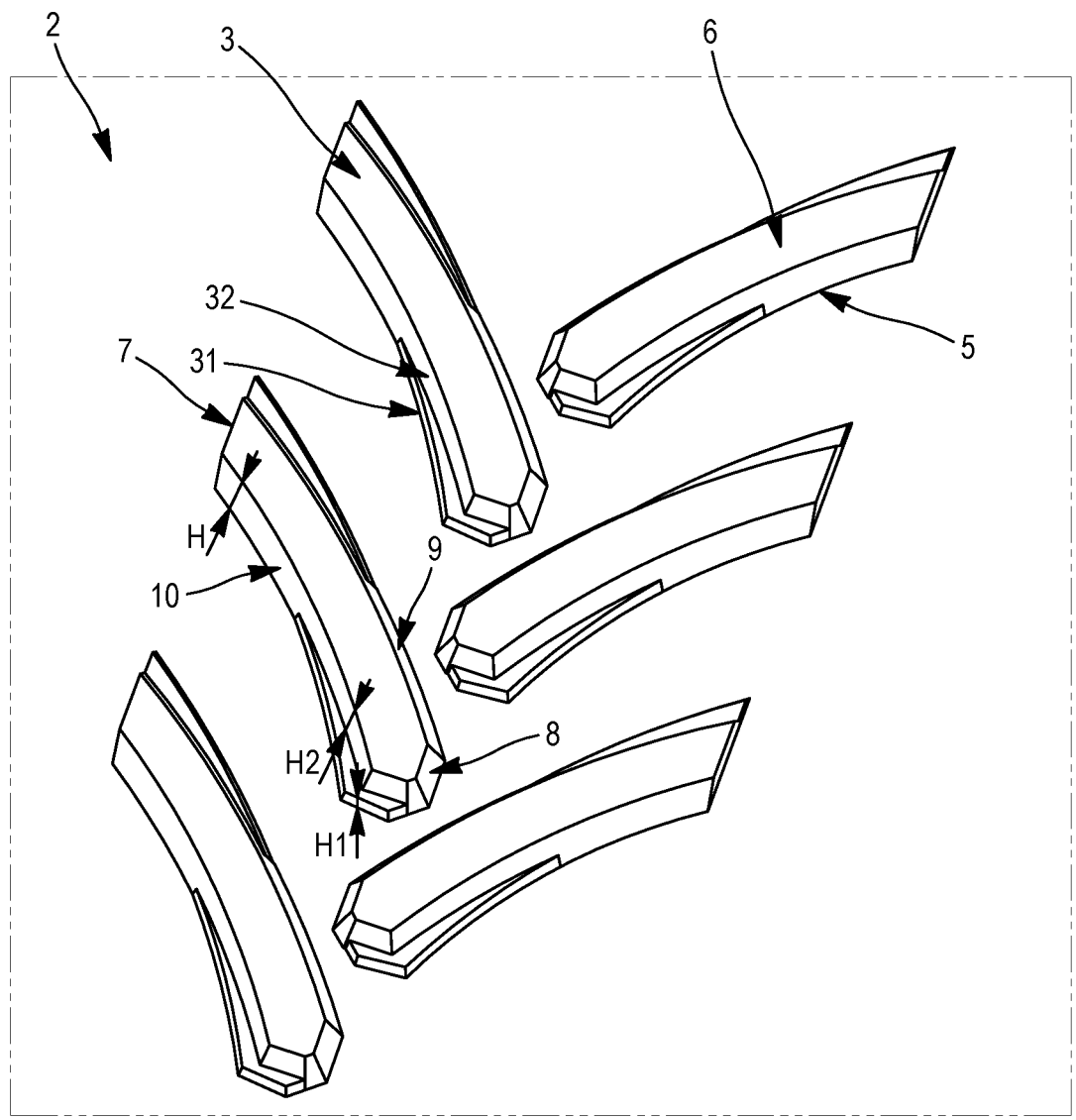
FIG. 2 shows a perspective view of a tread portion of a tire for an agricultural vehicle according to a first embodiment of the invention.

FIG. 2 is a perspective view of a portion of tread 2 of a tire for an agricultural vehicle according to a first embodiment of the invention, Each lug 3, having a height H, comprises a first, radially inner lug portion 31, extending radially outwards from the bottom surface 5 and having a height H1, and a second lug portion 32, extending radially outwards from the first lug portion 31 to the contact face 6, having a height H2. In this first embodiment, the first lug portion 31 is made up of a single layer $C1_1$ having a height $H1_1$ equal to H1. The single layer $C1_1$ of the first lug portion 31 is positioned in front of the leading face 10, that is to say offset forwards, in the vicinity of the axially inner end face 8, and behind the trailing face 9, that is to say offset towards the rear, in the vicinity of the axially outer end face 7.

Figure 3:
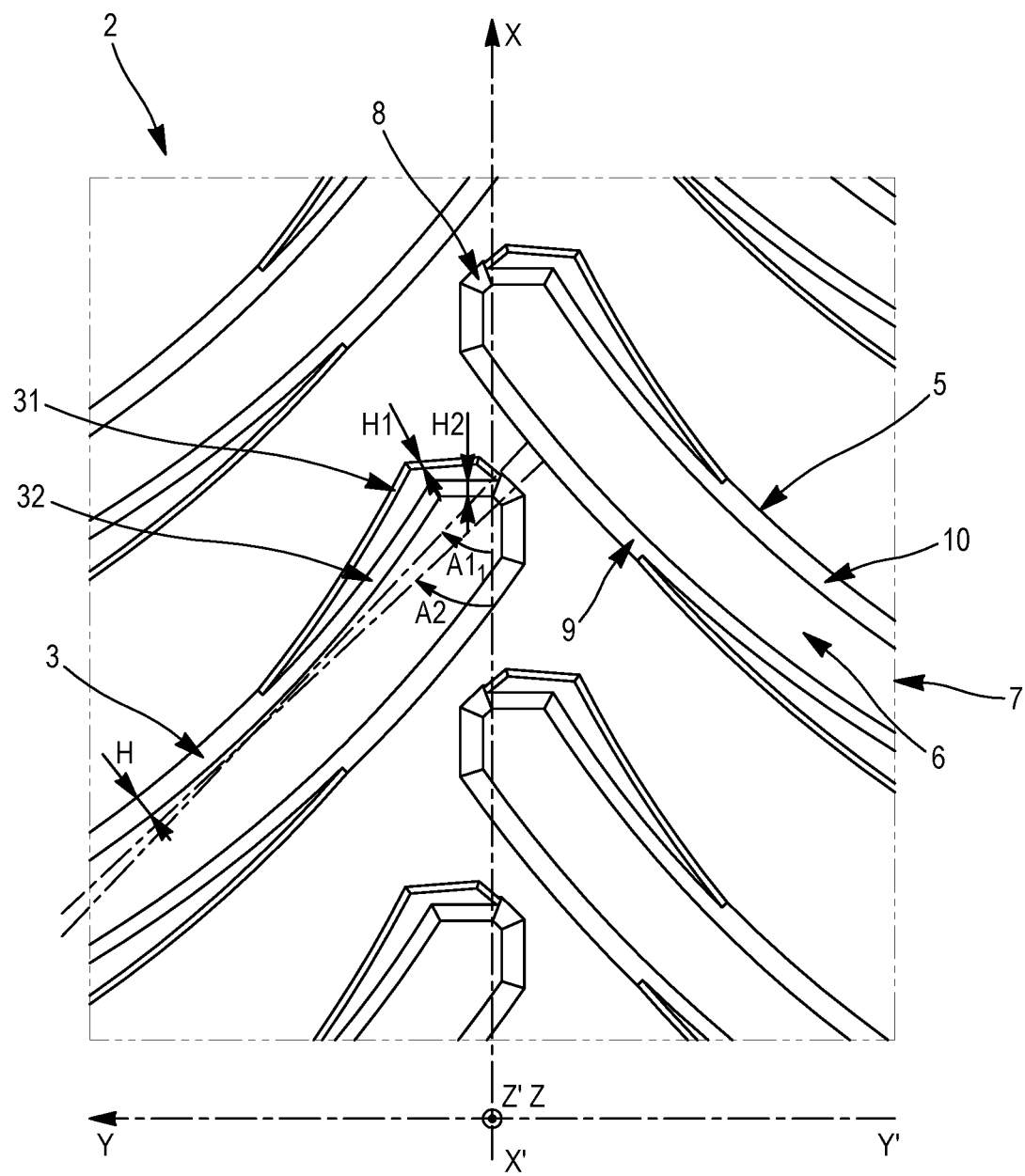
FIG. 3 shows a top view of a tread portion of a tire for an agricultural vehicle according to a first embodiment of the invention.

FIG. 3 is a top view of a portion of tread 2 of a tire for an agricultural vehicle according to the first embodiment of the invention. Each lug 3 comprises a first lug portion 31, extending radially outwards from the bottom surface 5 and having a height H1, and a second lug portion 32, extending radially outwards from the first lug portion 31 to the contact face 6, having a height H2 and a mean angle of inclination A2 with respect to a circumferential direction XX' of the tire. In this first embodiment, the first lug portion 31 is made up of a single layer $C1_1$ having a height $H1_1$ equal to H1. The single layer $C1_1$ of the first lug portion 31 has a mean angle of inclination $A1_1$, with respect to the circumferential direction XX' of the tire, that is strictly less than the mean angle of inclination A2 of the second lug portion 32, such that the layer $C1_1$ is positioned in front of the leading face 10, that is to say offset forwards, in the vicinity of the axially inner end face 8, and behind the trailing face 9, that is to say offset towards the rear, in the vicinity of the axially outer end face 7.

Figure 4:
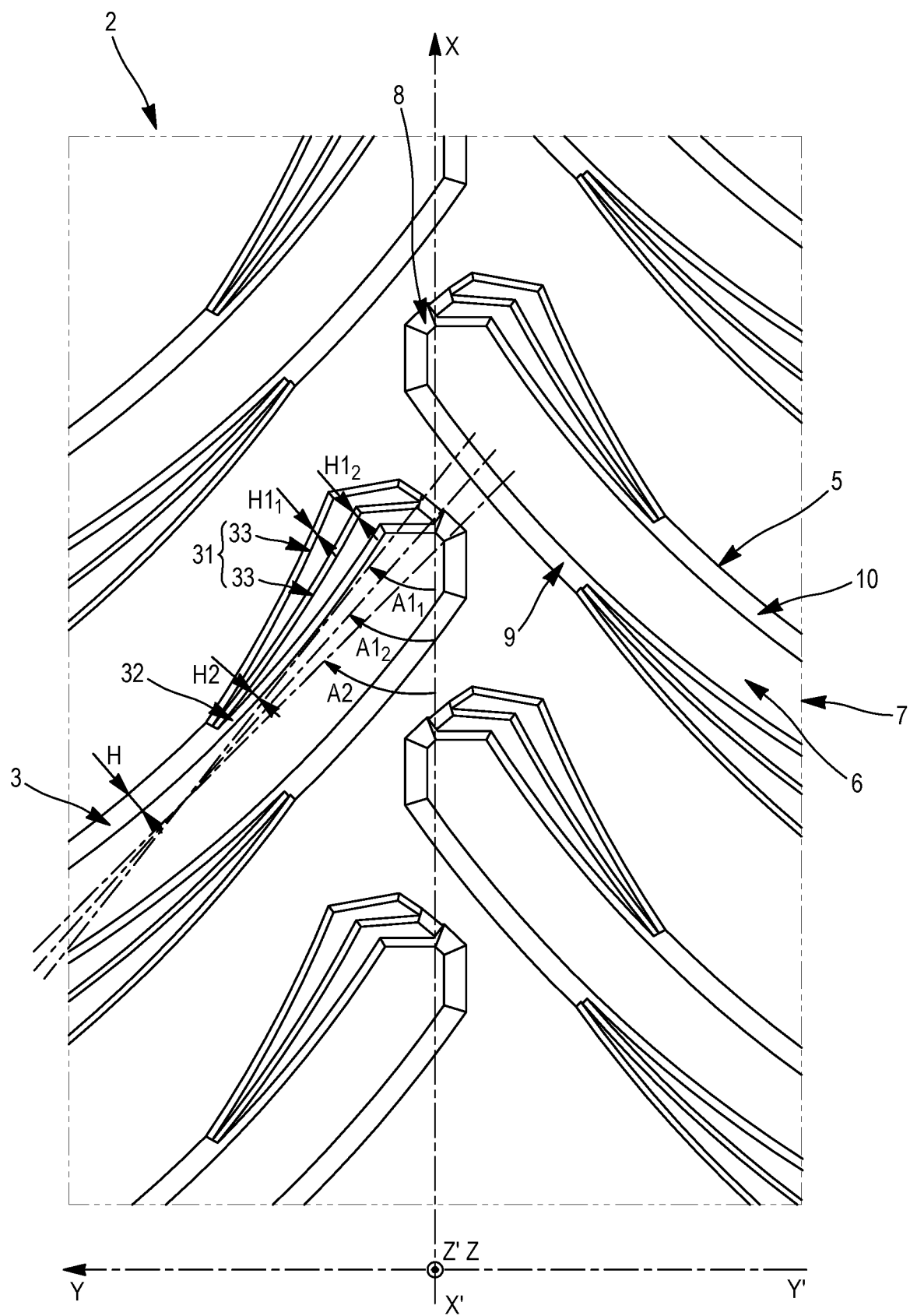
FIG. 4 shows a top view of a tread portion of a tire for an agricultural vehicle according to a second embodiment of the invention.

FIG. 4 is a top view of a portion of tread 2 of a tire for an agricultural vehicle according to a second embodiment of the invention. Each lug 3 comprises a first lug portion 31, extending radially outwards from the bottom surface 5 and having a height H1, and a second lug portion 32, extending radially outwards from the first lug portion 31 to the contact face 6, having a height H2 and having a mean angle of inclination A2 with respect to a circumferential direction XX' of the tire. The first lug portion 31 is made up of a radial superposition of 2 layers $C1_1$ and $C1_2$ (33, 33), having respective heights $H1_1$ and $H1_2$, such that the sum of the heights $H1_1$ and $H1_2$ is equal to the height H1 of the first lug portion 31, the layer $C1_1$ extending radially outwards from the bottom surface 5 and the layer $C1_2$ extending radially outwards to the second lug portion 32. The layers $C1_1$ and $C1_2$ have mean angles of inclination $A1_1$ and $A1_2$, respectively, with respect to the circumferential direction XX' of the tire, that are strictly less than the mean angle of inclination A2 of the second lug portion 32, such that the layers $C1_1$ and $C1_2$ are positioned respectively in front of the leading face 10, that is to say offset forwards, in the vicinity of the axially inner end face 8, and behind the trailing face 9, that is to say offset towards the rear, in the vicinity of the axially outer end face 7. Moreover, according to this second embodiment, the angle $B1_2 = A1_2 - A1_1$, between the two consecutive layers $C1_1$ and $C1_2$ of the first lug portion 31, and the angle $B2 = A2 - A1_2$, between the radially outermost layer $C1_2$ of the first lug portion 31 and the second lug portion 32, are equal to one another.

The invention has been implemented more particularly for an agricultural tire of size 600/70 R30. Table 1 below presents the technical features of an Example 1 of the first embodiment, presented in FIGS. 2 and 3, and those of an Example 2 of the second embodiment, presented in FIG. 4, respectively:

TABLE 1

|  | Example 1 (FIGS. 2 and 3) | Example 2 (FIG. 4) |
|---|---|---|
| Lug height H | 65 mm | 65 mm |
| Height of first lug portion H1 | 21 mm | 42 mm |
| Height of layers $H1_i$ | 21 mm for $H1_1$ | 21 mm for $H1_1$ and $H1_2$ |
| Height of second lug portion H2 | 44 mm | 23 mm |
| Mean angles of inclination of layers $A1_i$ | 42° | 37°, 42° |
| Mean angle of inclination of second lug portion A2 | 47° | 47° |

The inventors have been able to demonstrate, in internal tests, that the tires of Examples 1 and 2 made it possible to simultaneously improve the traction in the field and reduce the sensitivity of the leading faces of the lugs to attack by residual stubble.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A fire for an agricultural vehicle, comprising:
   a tread made up of lugs that are separated from one another by grooves;
   each said lug extending radially outwards, over a height H, from a bottom surface to a contact face, extending axially inwards from an axially outer end face to an axially inner end face, and extending circumferentially from a trailing face to a leading face;
   each said lug comprises a first lug portion, extending radially outwards from the bottom surface and having a height H1, and a second lug portion, extending radially outwards from the first lug portion to the contact face, having a height H2 and having a mean angle of inclination A2 with respect to a circumferential direction of the tire, wherein the first lug portion is comprised of a radial superposition of N layers $C1_i$, where i varies from 1 to N, each having a height $H1_i$, such that the sum of the heights $H1_i$ is equal to the height H1 of the first lug portion, the layer $C1_1$ extending radially outwards from the bottom surface and the layer $C1_N$ extending radially outwards to the second lug portion, wherein each said layer $C1_i$ has a mean angle of inclination $A1_i$, with respect to the circumferential direction of the tire, that is strictly less than the mean angle of inclination A2 of the second lug portion, such that the layer $C1_i$ is positioned in front of the leading face in the vicinity of the axially inner end face, and behind the trailing face in the vicinity of the axially outer end face, and wherein, when N is strictly greater than 1, the angle $A1_j$ relative to a layer $C1_j$, where j varies from 1 to N−1, is strictly less than the angle $A1_{j+1}$ relative to the layer $C1_{j+1}$, such that two consecutive layers ($C1_j$, $C1_{j+1}$) are rotationally offset with respect to one another by an angle $B1_j = A1_{j+1} - A1_j$.

2. The tire according to claim 1, wherein the height H1 of the first lug portion is strictly less than the height H of the lug.

3. The tire according to claim 1, wherein the height H1 of the first lug portion is at least equal to min (6 mm, 0.25*H).

4. The tire according to claim 1, wherein the height $H1_i$ of each said layer $C1_i$ is at most equal to 0.5 times the height H1 of the first lug portion.

5. The according to claim 1, wherein the height $H1_i$ of each said layer $C1_i$ is at least equal to min (3 mm, 0.1*H1).

6. The tire according to claim 1, wherein the height $H1_i$ of each said layer $C1_i$, where i varies from 1 to N, is equal to H1/N.

7. The tire according to claim 1, wherein the angle $B1_j = A1_{j+1} - A1_j$ between two consecutive layers ($C1_j$, $C1_{j+1}$), where j varies from 1 to N−1, is equal to $(A1_N - A1_1)/(N-1)$.

8. The tire according to claim 1, wherein the first lug portion is comprised of a radial superposition of N layers $C1_i$, where i varies from 1 to N, with N at least equal to 2.

9. The tire according to claim 1, wherein the first lug portion is comprised of a radial superposition of N layers $C1_i$, where i varies from 1 to N, with N at most equal to 10.

10. The tire according to claim 1, wherein the angle $A1_1$ relative to the layer $C1_1$, which is radially innermost, is at least equal to A2−45°.

11. The tire according to claim 1, wherein the angle $A1_N$ relative to the layer $C1_N$, which is radially outermost, is at most equal to A2−1°.

12. The tire according to claim 1, wherein the angle $B2 = A2 - A1_N$ is equal to $(A1_N - A1_1)/(N-1)$.

13. The tire according to claim 1, wherein two consecutive layers ($C1_j$, $C1_{j+1}$), where j varies from 1 to N−1, are joined together by fillets.

14. The tire according to claim 1, wherein the tread is comprised of a first and a second row of lugs disposed in chevrons with respect to the equatorial plane (P) of the tire.

15. The tire according to claim 1, wherein the height H1 of the first lug portion is at most equal to 0.5 times the height H of the lug.

* * * * *